E. C. KLINE.
PORTABLE GREENHOUSE OR THE LIKE.
APPLICATION FILED MAR. 3, 1909.
956,771.
Patented May 3, 1910.
3 SHEETS—SHEET 1.
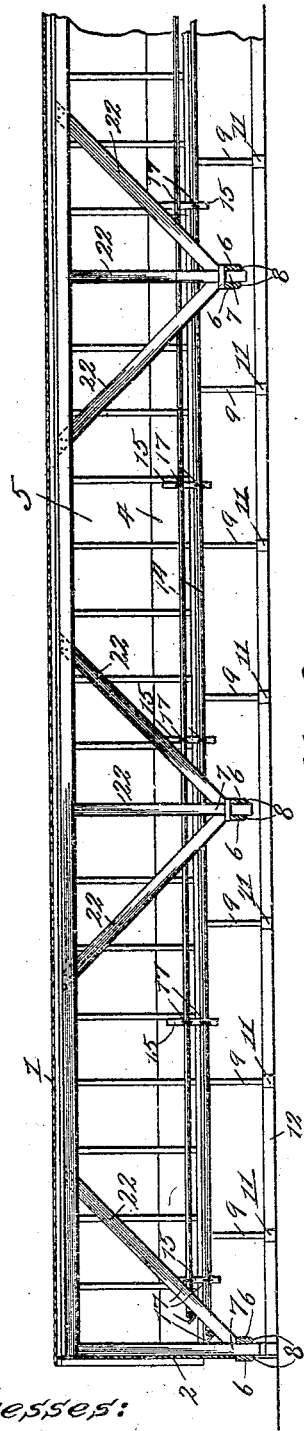
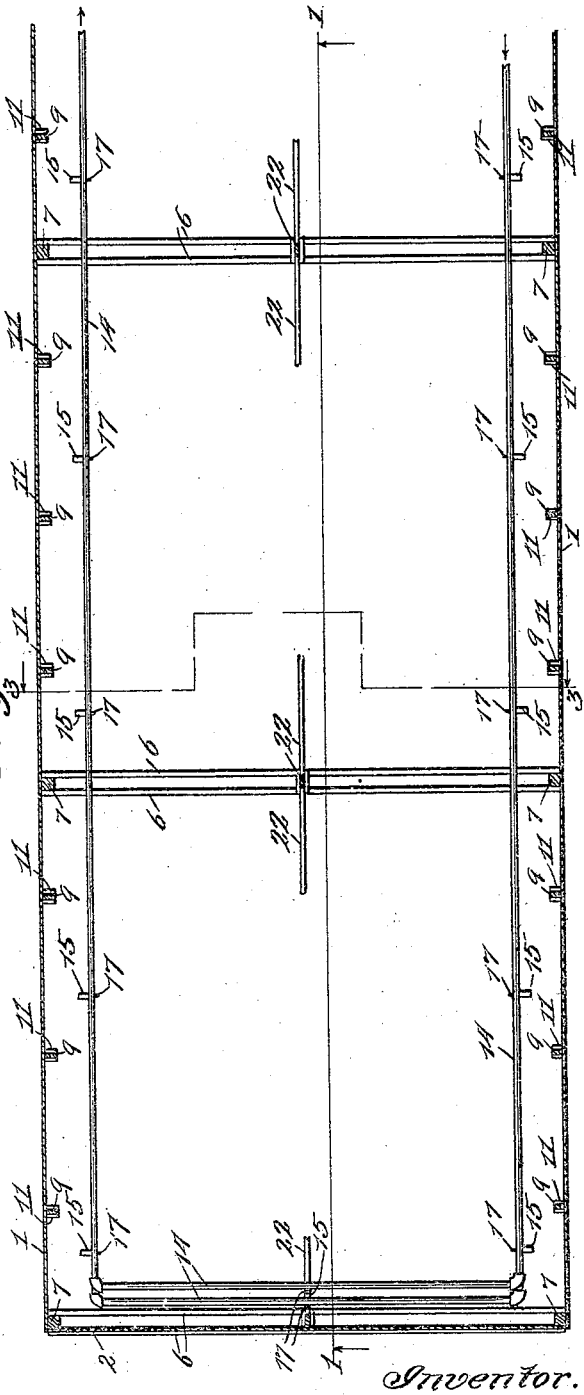
Witnesses:
Inventor.
Edward C. Kline
By Hill & Hill
Attys E. C. KLINE.
PORTABLE GREENHOUSE OR THE LIKE.
APPLICATION FILED MAR. 3, 1909.
956,771.
Patented May 3, 1910.
3 SHEETS—SHEET 2.
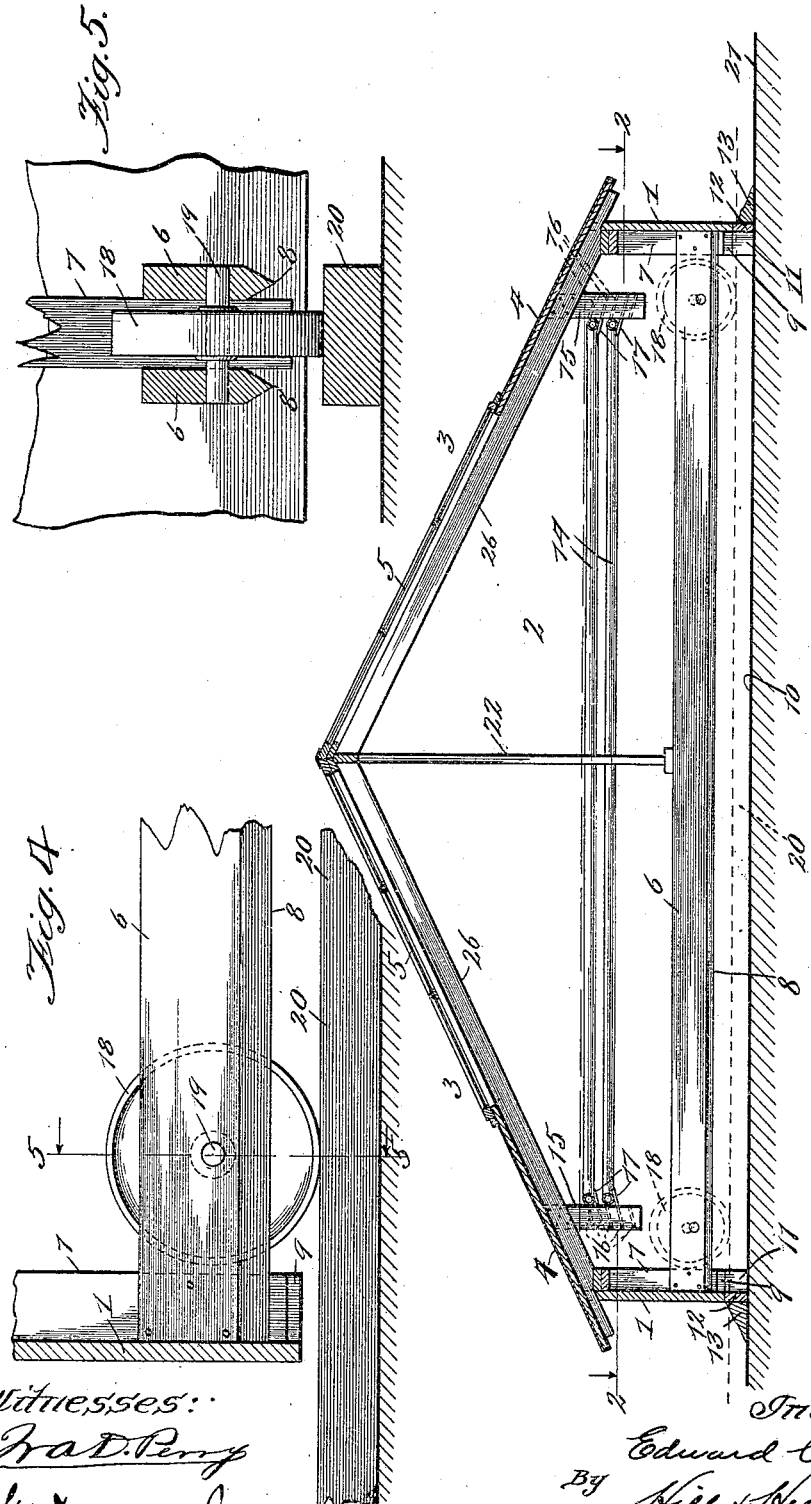

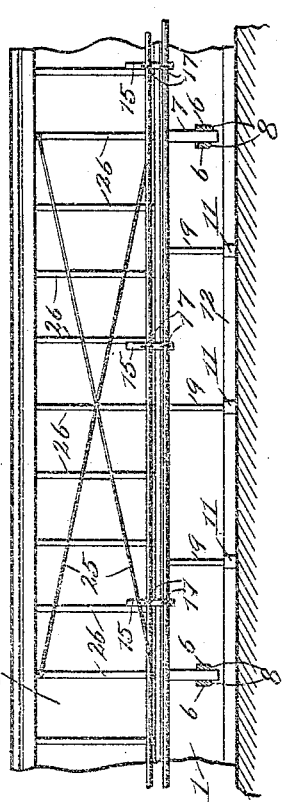

UNITED STATES PATENT OFFICE.

EDWARD C. KLINE, OF STREATOR, ILLINOIS.

PORTABLE GREENHOUSE OR THE LIKE.

956,771.          Specification of Letters Patent.       Patented May 3, 1910.

Application filed March 3, 1909. Serial No. 481,020.

*To all whom it may concern:*

Be it known that I, EDWARD C. KLINE, a citizen of the United States, residing at Streator, in the county of Lasalle and State of Illinois, have invented certain new and useful Improvements in Portable Greenhouses or the Like, of which the following is a description.

My invention relates to buildings and particularly to that class of buildings or houses known as green or hot houses, especially adapted for the raising of asparagus, green onions, pie plant and strawberries, and like plants, it being understood that it may be used wherever found applicable. Plants of this kind are cut, pulled, or the like or the fruit or berries gathered in some cases the roots remaining in the ground for plants to spring from or bear fruit at a later season. In order to force the plant ahead of the usual season it is customary in this kind of plant culture to construct frames over the plants and cover the same with removable frames containing glass or other suitable material. If it is then desired or necessary to move the same to another plant bed or location the house is substantially dismantled by removing the frames containing the glass or the like and positioning them in the new location, in which case there must be either a plurality of building frames or else the building frame must also be dismantled to move. Not only is there much labor and time required in dismantling the house and moving the frames but the damage from breakage is considerable. Another item to be considered is the question of the heating system which in a house of the construction mentioned must either be dismantled and moved or else a separate system provided for each location. In either case there are disadvantages, in the first, the expense of moving the heating system and in the second the cost of providing a number of heating systems, one for each location, and in the last mentioned case the exposure of the system to the weather when not covered by the frames.

My invention has for its objects the production of a portable green house of strength and stability at comparatively low cost, that may be quickly, easily and conveniently moved in its entirety, with the heating system or other fixtures within, without damage to the house or fixtures.

With my improved form of house it is not necessary to dismantle the heating system when the house is moved or to provide a heating system at each bed or location. With my improved construction as shown it should also be noted that no part of the plant bed is covered.

To this end my invention consists in the novel construction, arrangement and combination of parts herein shown and described and more particularly pointed out in the claims.

In the drawings wherein like reference characters indicate like or corresponding parts, Figure 1 is a vertical sectional view of a portion of a house taken substantially on line 1—1 of Fig. 2, Fig. 2 is a longitudinal horizontal sectional view of the same taken substantially on line 2—2 of Fig. 3, Fig. 3 is a transverse vertical sectional view of the house shown substantially on line 3—3 of Fig. 2, Fig. 4 is a side elevation of a portion of one of the supporting stringers showing one of the temporary supporting wheels in position, Fig. 5 is a vertical sectional view of the same taken substantially on line 5—5 of Fig. 4, Fig. 6 is a side elevation of a portion of one of the supporting stringers showing the building substantially permanently supported, Fig. 7 is a vertical sectional view of a portion of a house showing a slightly modified construction, and Fig. 8 is a plan view of a house arranged on a bed and several additional beds, temporary ways in position for the removal of the house of an adjacent bed.

Referring to the drawings, my preferred construction comprises side walls 1—1, end walls 2 and a suitable roof 3 therefor. The building is made as lightly as possible consistent with the strength required and while in the drawings the building is shown made of wood it is obvious that light steel or any suitable equivalent may be substituted. The side and end walls may be made and reinforced in any suitable manner and the roof may be of any preferred or suitable design. In the construction shown the roof 3 is shown as comprising a part 4 made of boards or the equivalent for the purpose and a glass or transparent portion 5, Fig. 7 showing a construction in which the roof is made substantially entirely of glass.

Extending transversely the building preferably near the lower edges of the side walls are a plurality of staying members or stringers 6—6, etc., which are shown secured to what may be termed studding members 7—7, etc., which serve to brace the side walls. The stringers 6—6 are preferably arranged in pairs and secured to each side of the studding members 7. Between studding members 7 are also preferably arranged a suitable number of studding members 9 extending substantially from the roof to the lower edge of the side walls. Referring particularly to Figs. 1 and 3, in which the building is shown in position over a plant bed 10, blocks 11 are arranged under the studding members 9 and substantially permanently support the building. A removable side wall part 12 may be arranged below the side walls 1—1 and the end walls, and tacked or secured to the blocks 11 in any suitable way a little loose dirt 13 being preferably thrown against the same giving a tight construction.

As shown most clearly in Fig. 5 the lower edge of the stringers 6—6, etc., are preferably beveled or brought to a point 8 so that the plants growing directly under the stringers will go to one side or the other and not be stunted by coming in contact with the stringers. The heating system may be of any suitable kind such as steam, hot water, or the equivalent. In the drawings pipes 14 are shown arranged within the building, it being understood that the arrangement may be as desired, the boiler 23 or other source of heat being shown diagrammatically and connected with the system by means of suitable pipes 24—24 or the equivalent. The pipes 14 may be arranged and supported within the building in any suitable manner the preferred construction comprising hangers 15 or the equivalent arranged to permit the adjustment of the pipes relative to the plant bed. A simple construction is shown for accomplishing this, in which the hangers are provided with a plurality of holes 16 in which are inserted pipe supporting pins or brackets 17 or their equivalent for the purpose.

The building is preferably moved by supporting the same during the moving upon a plurality of wheels and ways therefor. As most clearly shown in Figs. 3, 4 and 5, wheels 18 are provided which are preferably positioned between the stringers comprising a pair, substantially at the ends thereof and proximate to the side walls, the wheels being arranged to rotate in a direction transversely to the building. These wheels are preferably removably secured and positioned between the stringers 6—6 constituting a pair, in any suitable manner a pin 19 being shown for the purpose. During the moving operation, ways 20 or their equivalent are preferably provided for supporting the wheels and the structure carried thereby. While the wheels are shown flat and the ways 20 as planks it is of course obvious that the wheels or the ways may be of any suitable material and design.

When the roof is constructed substantially as shown in Figs. 1 and 3 the part 4 gives rigidity and stiffness to the structure. When the roof is made entirely of glass or the equivalent as shown in Fig. 7 suitable brace members 25 may be arranged as shown in this figure the same passing under or through the rafters or frames 26. It is of course obvious that any other style of bracing for the roof or other parts of the structure other than that shown may be employed or that the roof itself may be of any suitable or preferred construction.

When it is desired to move the building from one location to another as for example, from the bed 10 to the adjoining bed 21 (see Fig. 8) the heating system is disconnected from the pipes 24 or the source of supply, the removable side walls 12 removed and the ways 20 inserted under the structure 6—6 extending from the covered bed 10 to the adjoining plot or bed 21. The wheels are then positioned between the stringers as shown in Figs. 3, 4 and 5 and the building lifted at the stringers a sufficient height to permit the insertion of the pins 19 (the dotted lines in Fig. 6 showing the position of the wheels relative to the stringers before the building is lifted) so that the building is supported by the wheels upon the ways 20. The building with the heating system and fixtures contained within may then be pushed or pulled to the desired location and the wheels then removed, so that the building rests substantially permanently upon the blocks 11 where it may remain until it is desired to again move the same. The ways may then be removed and the removable side members 12 positioned, and the heating system again connected with the source of supply. The building may then be said to be permanently in position until such time as it is desired to again change its location. To distinguish the several steps, I refer to the building as substantially permanently supported when resting upon the blocks 11 and temporarily supported when carried by the wheels 18. It is thus seen that the building may be moved back and forth from several beds as desired and the plants in the house forced ahead of the season, it being possible to give a portion of the beds a rest for certain intervals. It is of course obvious that where I describe the positioning of the wheels I do not wish to be understood as meaning that they must necessarily be positioned in the manner mentioned.

In the house shown the plant bed occupies substantially all of the ground inclosed between the walls so that there is no lost space or unused ground and it might be noted that a house of the kind described may be of considerable length in proportion to its width it being practical to move with comparative ease a building of the kind described of a width of approximately 16 to 24 ft. and a length of approximately 300 to 600 or more ft., in the manner set forth.

Having thus described my invention it is obvious that various immaterial modifications may be made in the construction, arrangement and combination of parts herein shown and described and the building used wherever applicable without departing from the spirit of my invention, hence I do not wish to be understood as limiting myself to any particular arrangement, combination of parts, building construction, heating system or use for the building.

What I claim as new and desire to secure by Letters Patent is:

1. A portable structure of the kind described, comprising side walls, a roof therefor, stringers arranged in pairs at intervals transversely the structure near the lower edges of said side walls, a plurality of temporary supporting wheels and means for securing said wheels to the structure at said stringers.

2. In a portable building of the kind described, the combination of side walls, a roof therefor, a plurality of stringers arranged in pairs transversely the building near the lower edges of the walls, a plurality of temporary supporting wheels arranged between the stringers of each of said pairs near each of the ends thereof, and means for removably securing said wheels in position.

3. A portable green house of the kind described comprising the combination of walls and a suitable roof therefor, a plurality of stringers arranged in pairs transversely the house, a plurality of wheels arranged between and substantially at the ends of said stringers comprising a pair, means for removably securing said wheels in position and temporary ways for said wheels.

4. In a portable green house of considerable length relative to its width and in combination, side walls and a roof therefor, a plurality of stringers connecting said walls and arranged in pairs at intervals throughout the length thereof, roof bracing and supporting members supported by said stringers, a heating system including pipes carried by the stringers, a plurality of substantially permanent supporting members for said side walls, a plurality of temporary supporting wheels for said structure arranged at intervals along the side walls, and means for removably securing the said wheels to said stringers.

5. In a transversely movable building for covering plant beds and in combination, side and end walls and a suitable roof therefor, stringers arranged in pairs at intervals connecting said side walls, said stringers beveled on the lower edges thereof, removable means for substantially permanently supporting the building, heating system pipes arranged within said structure and carried thereby, wheels positioned proximate to the side walls between the stringers comprising a pair, means for securing said wheels in position, and removable ways for said wheels connecting the covered bed with an adjacent plot of ground.

In testimony whereof I have hereunto signed my name in the presence of two subscribing witnesses.

EDWARD C. KLINE.

Witnesses:
H. W. LUKENS,
LOUIS NATER.